3,326,873
METHOD OF SPLITTING S—S BONDS IN ORGANIC COMPOUNDS USING BASIC ORGANIC NITROGEN COMPOUNDS
Chi Hua Wang, Lexington, Mass., assignor to Arthur D. Little, Inc., Cambridge, Mass., a corporation of Massachusetts
No Drawing. Filed May 20, 1963, Ser. No. 281,791
3 Claims. (Cl. 260—88.7)

This invention relates to a novel chemical reaction and, more particularly, to a chemical reaction which achieves the cleavage of disulfide linkages by a redox system.

Disulfide linkages are present in many organic compounds including those which occur naturally and those which are made synthetically. It is often desirable to be able to break these linkages between the sulfur atoms in order to either modify the compound or to provide a route for the manufacture of other sulfur-containing compounds. For example, some proteins contain the disulfide linkage and it is often desirable to modify these proteins either chemically or physically to improve their properties. Thus the commonly used so-called permanent hair-waving solutions depend for their action upon their ability to temporarily break the sulfide linkages in the hair molecules for setting into a desired configuration. As another example, the modification of wool to render it more crease resistant may be cited. The novel reaction of this invention can also be employed to provide the necessary free radicals and the reactive sites for initiating and inducing polymerization of such monomers as vinyls.

The cleavage of organic disulfides through a chemical reaction to produce thiyl radicals and mercaptide ions offers a system for biological research including the study of aging which is believed to be due to irreversible cross-linking of protein molecules, the possible furnishing of radiation protection and repair, and the possible application to chemotherapy.

In the prior art, the rupture of S—S linkages by free radical process is carried out in one of two ways—either by photodissociation or thermal agitation which is unimolecular, or by a bimolecular radical displacement reaction. The first of these methods requires supplying energy while the second requires an external radical which in turn must be generated through the expenditure of energy. In contrast to these prior art methods, the method of this invention is a novel chemical reaction which proceeds at room temperature without the need for supplying either external energy or additional radicals.

It is, therefore, a primary object of this invention to provide a new method for chemically cleaving the disulfide linkage found in organic compounds. It is another object of this invention to provide a method of modifying compounds or naturally occurring materials which contain the disulfide linkage and hence to impart improved properties to them. It is still an additional object of this invention to provide a new polymerization catalyst, which may be used either in bulk polymerization, solution or emulsion polymerization, or in polymerization which takes place in a liquid suspension. Other objects of the invention will in part be obvious and will in part be apparent hereinafter.

The method of this invention may be characterized as the breaking of the disulfide linkage in an organic disulfide compound by the addition of a basic organic nitrogen compound. The reaction is carried out in a liquid medium which is a solvent for the two reactants. The components formed by the splitting of the disulfide link may be isolated through further reaction or may be used as a source of reactive sites for catalysis purposes.

Using an amine of the formula $R_3N$ as the basic nitrogen compound, and $\phi S$—$S\phi$ as a disulfide, the mechanism by which such an amine may induce the cleavage of the S—S bond by a free radical process may be postulated as follows:

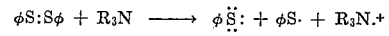

The disulfide S—S linkages in organic compounds vary greatly in strength. Thus, it is possible to break the weaker links much more readily than those which form stronger bonds. As an example, the S—S bond in a diaryl disulfide such as diphenyl disulfide is relatively weak and may readily be broken by the process of this invention. Likewise, S—S bonds forming a portion of a cyclic ring such as in lipoic acid are generally under strain and may be more readily broken than those linkages which are not. This is also true of the cyclic disulfides such as naphthacene tetrasulfide. S—S bonds in dialkyl compounds, on the other hand, are generally stronger and less readily cleaved. However, as will be apparent from the examples given below, the process of this invention is applicable to all disulfide bonds, the cleavage of those which are stronger proceeding at a slower rate.

The basic organic nitrogen compound suitable for the free radical process of this invention may be defined as an amine, a definition which is meant to include those compounds in which at least one of the hydrogens in $NH_3$ have been replaced by an organic radical R wherein the R's may be alkyl, substituted alkyl, aryl, substituted aryl, and mixtures of alkyl and aryl. This definition is also meant to include the conjugated cyclic amines. Thus the term "amine" is used in its broadest sense in describing and claiming the process of this invention.

The S—S bond cleavage is carried out in a medium which is a liquid and at least a partial solvent for the disulfide and the amine. It is preferable to introduce the amine into the liquid medium first and then add the organic disulfide. However, the disulfide may be added first so long as it is not premixed with the amine prior to their introduction into the liquid medium. This method, of course, is adaptable to a continuous process wherein a stream of amine-containing solvent is continuously mixed with a stream of disulfide-containing solvent. Suitable reaction media include, but are not limited to, water, the lower aliphatic alcohols such as methanol, ethanol and the isopropanols, benzene and the aromatic alcohols such as phenol, and the like. If the moieties formed in the disulfide cleavage are to be used in a second reaction system, e.g., as a source of reactive sites for polymerization, then the amine is preferably introduced into the second reaction system and the disulfide added to it. Again, however, the order may be reversed if desired. As an example, the amine may be dissolved in a vinyl monomer and the disulfide, dissolved in a suitable liquid medium, is then added to the monomer. Alternatively, the second reaction system may be dissolved or dispersed in a liquid reaction medium such as defined above.

The reaction is preferably carried out in a substantially oxygen-free environment. Thus it may be achieved under conditions of reduced pressure, for example, $10^{-2}$ millimeters, or in an atmosphere of an inert gas such as nitrogen, argon and the like. The reaction time will depend upon the organic compound in which the disulfide linkage is present; that is, upon the strength of the disulfide bond, as discussed above. In general, compounds which contain a weak disulfide bond, i.e., a diaryl disulfide are easily cleaved at room temperatures, whereas those compounds which contain a relatively strong disulfide bond, i.e., a dialkyl disulfide, may require longer reaction times and/or elevated temperatures.

In carrying out the reaction of this invention, the amine used to effect the disulfide bond cleavage should preferably be used in equal molar quantities with the organic disulfide. Some variation from this stoichiometric ratio may, of course, also be used.

The following examples are presented to further describe the method of this invention, and they are meant to be illustrative and not limiting.

In obtaining the data for Examples 1–17, 10 grams of acrylonitrile monomer and 20 mg. of the amine (equivalent to 0.1 mol percent of the monomer) were placed in one arm of a double-arm tube. The other arm contained 20 mg. of the disulfide dissolved in methanol except where noted. The tube was evacuated to about $10^{-2}$ mm. Hg to achieve substantially oxygen-free reaction conditions and then tipped in a manner to introduce the disulfide solution into the monomer containing the catalyst. Cleavage of the disulfide linkage was indicated by the polymerization of the vinyl monomer. Data are presented in terms of the relative rate of the polymerization of acrylonitrile as estimated from the degree of turbidity developed which in turn was a measure of the amount of polymer formed over the period of time indicated. Thus, in the tabulated data the larger the number the more efficient the system was in achieving disulfide cleavage. In these evaluations the number 10 was arbitrarily selected as representing the maximum degree of polymerization attainable.

ample 16) where slight turbidity was observed indicating cleavage of a portion of the bonds to give reactive sites for polymerization of the acrylonitrile to take place.

From the above description and examples it will be seen that there is provided a novel chemical reaction for the cleaving of organic disulfide bonds. Although it is necessary to supply a substantially oxygen-free atmosphere, no drastic reaction conditions of either temperature or pressure are required.

It will thus be seen that the objects set forth above among those made apparent from the preceding description are efficiently attained and since certain changes may be made in carrying out the above method without departing from the scope of the invention, it is intended that all matter contained in the above description shall be interpreted as illustrative and not in a limiting sense.

I claim:
1. Method of cleaving the S—S bond in an organic disulfide comprising the steps of
  (a) dispersing an organic disulfide, selected from the group consisting of diaryl disulfides, substituted diaryl disulfides, dialkyl disulfides, and cyclic disulfides, in a liquid medium which is at least a partial solvent therefore; and
  (b) adding to said liquid under substantially oxygen-free conditions an amine which is soluble in said liquid, said amine being selected from the group

| Example No. | Disulfide | Amine | Polymerization Rate | | |
|---|---|---|---|---|---|
| | | | 30 min. | 60 min. | 180 min. |
| 1 | Diphenyl disulfide | Aniline | 0 | 2 | 10 |
| 2 | ----do---- | Ethanolamine | 1 | 6 | 9 |
| 3 | ----do---- | 2-amino-2-methyl-1,3-propanediol | 0 | 1 | 10 |
| 4 | ----do---- | Diethylamine | 1 | 1 | 9 |
| 5 | ----do---- | Triethylamine | 2 | 2 | 8 |
| 6 | ----do---- | Tributylamine | 9 | 10 | 10 |
| 7 | ----do---- | Dimethyl aniline | 10 | 10 | 10 |
| 8 | ----do---- | Tribenzylamine | Turbidity | | |
| 9 | ----do---- | Pyridine | 1 | 6 | 10 |
| 10 | ----do---- | N-methyl pyridine | 3 | 3 | 8 |
| 11 | ----do---- | 2-6-dimethyl pyridine | 1 | 1 | 1 |
| 12 | ----do---- | 2,4,6-trimethyl pyridine | 6 | 10 | 10 |
| 13 | Bis(4,4'-carboxyphenyl) disulfide* | Ethanolamine | Turbidity | | |
| 14 | Lipoic acid* | ----do---- | 5 | | |
| 15 | ----do---- | Dimethyl aniline | 10 | | |
| 16 | Di-n-heptyl disulfide | ----do---- | Slight turbidity | | |
| 17 | | Ethanolamine | No reaction | | |
| 18 | Lipoic acid | | No reaction | | |

*In water.

The examples given above indicate that diaryl disulfides (Examples 1–12), substituted diaryl disulfides (Example 13), and dialkyl sulfides (Example 16) may be cleaved by the method of this invention. Likewise, the S—S bond within a ring structure, as illustrated by lipoic acid (Examples 14 and 15) may be readily split.

The examples given in the tabulation above also illustrate the use of various amines, including primary, secondary and tertiary (whether alkyl or aromatic) and substituted amines of these general classes. These data also illustrate the use of conjugated cyclic amines (the pyridines and substituted pyridines) in the role of catalyst in this method of splitting organic disulfides. Finally, it will be seen that both methyl alcohol and water were used as the liquid reaction medium.

Example 17 and 18 are of interest inasmuch as they illustrate that when either the disulfide or the amine is omitted no polymerization is effected in the evaluation system described above. Thus, these two examples serve as controls and illustrate that it is in fact the amine which is bringing about the cleavage of the S—S bond.

It will be seen from these data that the weaker S—S bonds are more readily cleaved, but that the method of this invention is applicable to a dialkyl disulfide (Exconsisting of alkyl amines, substituted alkyl amines, aryl amines, substituted aryl amines, and conjugated cyclic amines.

2. Method in accordance with claim 1 wherein said organic disulfide and said amine are alcohol-soluble and said liquid reaction medium is an organic liquid.

3. Method in accordance with claim 1 wherein said liquid reaction medium is a vinyl monomer.

References Cited
UNITED STATES PATENTS

| | | | |
|---|---|---|---|
| 2,529,315 | 11/1950 | Serniuk | 260—88.7 |
| 2,813,849 | 11/1957 | Kern | 260—88.7 |
| 2,926,160 | 2/1960 | Kern | 260—88.7 |
| 2,979,532 | 4/1961 | MacGregor | 260—608 |
| 3,022,351 | 2/1962 | Mihm et al. | 260—608 |
| 3,088,939 | 5/1963 | Miller | 260—88.7 |
| 3,098,060 | 7/1963 | Miller | 260—88.7 |

JOSEPH L. SCHOFER, *Primary Examiner.*

DONALD CZAJA, *Examiner.*

H. WONG, *Assistant Examiner.*